United States Patent

Carpenter et al.

[11] Patent Number: 5,874,387
[45] Date of Patent: Feb. 23, 1999

[54] METHOD AND CEMENT-DRILLING FLUID CEMENT COMPOSITION FOR CEMENTING A WELLBORE

[75] Inventors: Robert B. Carpenter, Allen; David L. Johnson, Dallas, both of Tex.

[73] Assignee: Atlantic Richfield Company, Los Angeles, Calif.

[21] Appl. No.: 666,783

[22] Filed: Jun. 19, 1996

[51] Int. Cl.[6] .............................. C09K 3/00; F21B 33/16
[52] U.S. Cl. .................... 507/228; 507/219; 507/226; 507/224; 507/231; 507/230
[58] Field of Search .................... 507/226, 230, 507/231, 224, 228, 219

[56] References Cited

U.S. PATENT DOCUMENTS

| | | | |
|---|---|---|---|
| 4,176,720 | 12/1979 | Wilson | 166/293 |
| 4,216,022 | 8/1980 | Wilson | 106/104 |
| 4,276,182 | 6/1981 | Beirute | 252/8.55 R |
| 4,322,301 | 3/1982 | Blackmore | 252/8.5 A |
| 4,342,866 | 8/1982 | Kang et al. | 536/119 |
| 4,374,738 | 2/1983 | Kelley | 252/8.5 C |
| 4,423,781 | 1/1984 | Thomas | 166/312 |
| 4,717,488 | 1/1988 | Seheult et al. | 252/8.551 |
| 4,883,125 | 11/1989 | Wilson et al. | 166/291 |
| 4,888,120 | 12/1989 | Mueller et al. | 252/8.551 |
| 4,892,898 | 1/1990 | Leighton et al. | 147/125 |
| 4,953,620 | 9/1990 | Bloys et al. | 166/293 |
| 4,976,316 | 12/1990 | Carpenter et al. | 166/291 |
| 5,005,646 | 4/1991 | Bloys et al. | 166/291 |
| 5,027,900 | 7/1991 | Wilson | 166/285 |
| 5,030,366 | 7/1991 | Wilson et al. | 252/8.551 |
| 5,038,863 | 8/1991 | Bloys et al. | 166/291 |
| 5,101,902 | 4/1992 | Parcevaux et al. | 166/291 |
| 5,113,943 | 5/1992 | Wilson et al. | 166/291 |
| 5,292,367 | 3/1994 | Bloys et al. | 106/802 |
| 5,316,083 | 5/1994 | Nahm et al. | 166/291 |
| 5,360,787 | 11/1994 | Bloys et al. | 507/124 |

OTHER PUBLICATIONS

Dobson, J. W., Jr. et al., Development of a Unique Low Solids, High Density Drilling Fluid System, American Association of Drilling Engineers Drilling Fluids Technology Conference (Houston, Apr. 3&4, 1996).

*Primary Examiner*—C. H. Kelly
*Attorney, Agent, or Firm*—F. Lindsey Scott

[57] ABSTRACT

A method and a drilling fluid/cement slurry composition for cementing a wellbore. The drilling fluid/cement slurry composition comprises A cement slurry composition comprising:
  a) a cementitious material;
  b) a drilling fluid; and
  c) a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene sulfonated or phosphonated vinyl toluene, sulfonated or phosphonated isobutylene, acrylamidopropane sulfonate, acrylamidopropanephosphonate, vinyl alcohol, sulfonated or phosphonated propene and alkali, alkaline earth and ammonium salts thereof.

29 Claims, 1 Drawing Sheet

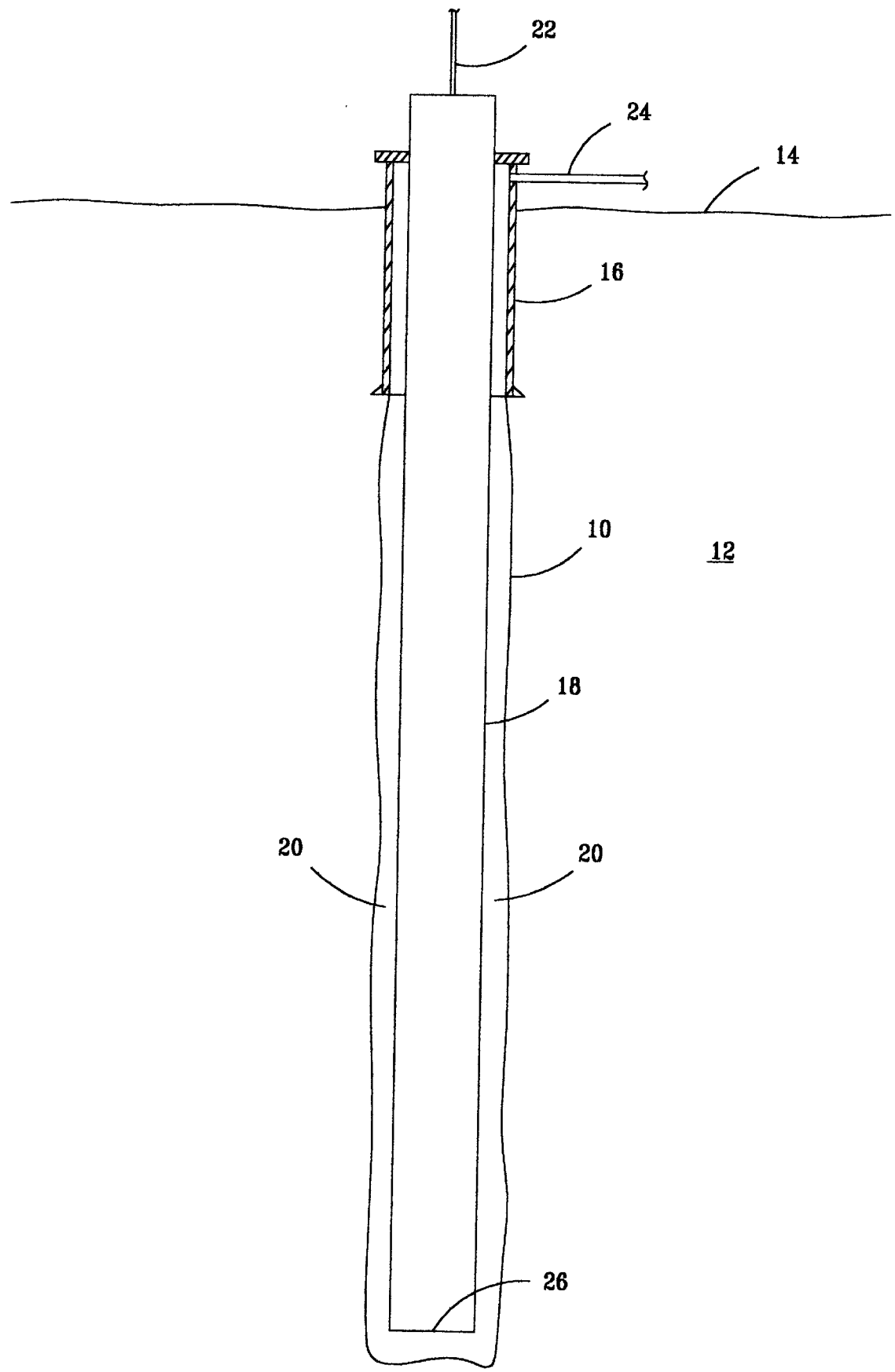

METHOD AND CEMENT-DRILLING FLUID CEMENT COMPOSITION FOR CEMENTING A WELLBORE

BACKGROUND OF THE INVENTION

1. Field of the Invention

This invention relates to a method and a drilling fluid/cement slurry composition for cementing a wellbore. More specifically the present invention relates to a method and composition for displacing drilling fluid from an annular space in a wellbore and sealingly occupying the space with the drilling fluid/cement composition.

2. Description of the Prior Art

Techniques and methods are well known for drilling and completing wells, particularly oil and gas wells which are drilled from the surface of the earth into subterranean formations containing oil and gas. Typically a bore hole is drilled from the earth's surface to the fluid-containing geologic formation to permit recovery of the fluid material contained therein.

Such wells are typically drilled by positioning a conductor tube or casing from the earth's surface a short distance into the earth and thereafter initiating drilling operations through the conductor tube. Drilling operations are conducted by maintaining a weight on a drill bit which is rotated by a drill string which is a length of pipe extending from the surface to the drill bit. Drilling fluids (frequently referred to as drilling muds) are passed through the drill string and the drill bit into the wellbore where they perform a variety of functions such as removing drill cuttings upwardly around the outside of the drill string to the surface.

Drilling fluids used during drilling of the wellbore are generally classified on the basis of their principal component. When the principal component is a liquid (water or oil) the term "mud" is applied to a suspension of solids in the liquid. The most common drilling fluids contain water as the principal component and are referred to as water based drilling fluids or water muds.

Water based drilling fluids vary widely in composition and properties and many have been classified based upon their principal ingredients. Some common classifications of water-based drilling fluids are fresh water muds, low solid muds, spud muds, salt water muds, lime muds, gyp muds and CL-CLS muds.

In addition to water, drilling fluids often contain several known additives which perform various functions in the drilling fluid system. Among the most common additives are materials which increase density such as barite and hematite and viscosifiers or thickening agents such as clays (usually bentonite). The term drilling fluid as used herein includes spacer fluids which typically comprise a drilling fluid containing no viscosifiers or densifiers.

Many water-based drilling fluids are also formulated to contain one or more polymeric additives which serve to reduce the rate of filtrate loss, stabilize clays, flocculate drilled solids, increase carrying capacity, emulsify, lubricate and the like. Among the most commonly employed polymeric additives are starches, guar gum, xanthan gum, sodium carboxyl-methylcellulose (CMC), hydroxyethylcellulose (HEC), carboxyl methyl hydroxyethyl cellulose (CMHEC) and synthetic water dispersable polymers such as acrylics and alkylene-oxide polymers.

Such drilling fluids also frequently contain materials referred to broadly as "dispersants". Materials conventionally used as dispersants are classified as plant tannins, polyphosphates, lignitic materials, synthetic water dispersable polymers and lignosulfonates. Such drilling fluids are described in considerable detail in U.S. Pat. No. 5,030,366, "Spacer Fluids", issued Jul. 9, 1991 to Wilson et al; U.S. Pat. No. 5,113,943, "Spacer Fluids", issued May 19, 1992 to Wilson et al; and U.S. Pat. No. 5,292,367, "Dispersant Compositions for Subterranean Well Drilling and Completion", issued Mar. 8, 1994 to Bloys et al; all of which are hereby incorporated in their entirety by reference.

After the wellbore has been drilled, the casing is secured in position in the wellbore to ensure permanence of the wellbore and to control the entry of fluids into the casing from formations penetrated by the wellbore. The well casing is typically cemented in place by pumping a cement slurry downwardly through the casing, out through the open lower end of the casing at the well bottom and then upwardly around the casing in the annular space between the outer wall of the casing and the inner wall of the wellbore. Frequently a spacer fluid is pumped downwardly through the casing ahead of the cement slurry to form a buffer between and prevent the contact of the drilling fluid and the cement slurry which are typically incompatible fluids.

The drilling process which produces the wellbore will usually leave behind on the wall of the wellbore a drilling fluid filter cake of mud-like material. This material is detrimental to the formation of proper bonding between the cement composition and the walls of the wellbore.

Desirably the drilling fluid filter cake is removed from the wellbore wall and replaced by the cement slurry to permit the formation of a solid layer of hardened, cured and bonded cement between the casing and the walls of the wellbore. It is well known that the removal of the drilling fluid filter cake is greatly enhanced by injecting the cement slurry, spacer fluid or the like into the wellbore under turbulent flow conditions.

Suitable spacers for this purpose have been disclosed in U.S. Pat. Nos. 5,030,366; 5,113,943 and 5,292,367 previously incorporated by reference. In cementing oil and gas wells, rather than displacing and removing the drilling fluid during cement slurry placement, it has been proposed to convert the drilling fluid into a cementious slurry for cementing casing or tubing in place or otherwise stabilizing or protecting the casing by sealing the formation in the vicinity of the wellbore using a dispersant such as sulfonated styrene maleic anhydride (SSMA). Such a method is disclosed in U.S. Pat. No. 4,883,125, "Cementing Oil and Gas Wells Using Converted Drilling Fluid," issued Nov. 28, 1989 to Wilson et al; which is hereby incorporated in its entirety by reference.

Drilling mud constitutes a waste stream or a waste material when the drilling operation is concluded unless it can be used in another well drilling operation or the like. Further, the disposal of drilling muds is subject to increasingly severe environmental restrictions. Accordingly, it is desirable that the amount of surplus drilling fluid remaining for disposal at the end of the well completion be minimized. As a result there has been considerable interest in using the drilling fluid in combination with cementious materials to produce a cementitious slurry-drilling fluid mixture for use in cementing the casing in the well.

The conversion of drilling fluid or "mud" to a cement slurry is subject to several operational problems and undesirable compositional changes. For instance, the addition of cementitious materials such as mixtures of lime, silica and alumina, lime and magnesia, silica, alumina and iron oxide, cement materials such as calcium sulphate and Portland cements, pozzolanic materials such as ground slag, fly ash and the like to drilling fluids can substantially increase the viscosity of the fluid mixture and result in severe flocculation. Efforts to circulate such mixtures through a wellbore can result in highly unsatisfactory circulation rates, plugging of the wellbore annulus, breakdown of the earth formation in the vicinity of the wellbore, failure of the cement slurry to properly mix and the like.

These problems can be overcome by the addition of a dispersant composition which disperses both the drilling fluid and the cement slurry mixture. However, conventional drilling fluid dispersants do not necessarily disperse cement slurries and conventional cement slurry dispersants do not necessarily disperse drilling fluids. In addition, conventional dispersants which disperse both drilling fluids and cement slurries do not necessarily disperse mixtures of drilling fluids and cement slurries.

It is known in the art that hydroxypropyl acrylate-acrylic acid copolymer, sulfonated vinyl toluene-maleic anhydride copolymer, sulfonated vinyl toluene-maleic anhydride copolymer (SVT-MA), sulfonated methyl, ethyl, or phenyl polyacrylamide, and copolymers of ethylenic acids, acrylamides and ethylenic esters of phosphoric acid, and the sodium salts thereof act as dispersants or deflocculants in drilling fluids.

As further disclosed in U.S. Pat. No. 5,292,367, polymers including hydroxypropyl acrylate-acrylic acid copolymer, sulfonated vinyl toluene-maleic anhydride copolymer, sulfonated vinyl toluene-maleic acid copolymer, sulfonated methyl, ethyl or phenyl polyacrylamide, copolymers of ethylenic acids, acrylamides and ethylenic esters of phosphoric acid, acrylic acid polymers, acrylamide polymers, and sulfonated and/or phosphonated copolymers of acrylic acid and acrylamide are effective to disperse mixtures of drilling fluids and cement slurries. Unfortunately, the preferred polymers (SSMA and SVT-MA) are in short supply and are not readily available commercially in the quantities necessary for drilling operations.

Accordingly, continuing efforts have been directed to the development of alternate methods and other dispersants for use to disperse mixtures of drilling fluids and cement slurries to produce drilling fluid/cement slurry compositions for use in cementing oil wells.

SUMMARY OF THE INVENTION

According to the present invention, a wellbore space occupied by drilling fluid may be sealingly occupied by a cement slurry composition by displacing the drilling fluid with the cement slurry composition wherein the cement slurry composition comprises a cementitious material, a drilling fluid and a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof.

In some instances a spacer may be circulated ahead of the cement slurry composition through at least a portion of the space occupied by drilling fluid to remove at least a portion of the drilling fluid from at least a portion of the annular space prior to introduction of the cement slurry composition into the space.

The present invention further comprises a cement slurry composition comprising a cementitious material, a drilling fluid and a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof.

BRIEF DESCRIPTION OF THE DRAWINGS

The drawing is a schematic diagram of a wellbore including a casing positioned in the earth.

DESCRIPTION OF THE PREFERRED EMBODIMENTS

A wellbore 10 shown in the FIGURE is positioned from a surface 14 into the earth 12 and may be an oil well or the like. Wellbore 10 includes a first casing 16 which may be a conductor or the like positioned from a well head at the surface 14 which supports a second casing 18 which extends to near a bottom 26 of the wellbore 10. An annular space 20 is defined by the outer diameter of the casing 18 and the inner diameter of the wellbore 10. In typical cementing operations a cement slurry composition is introduced through a line 22 and passed downwardly through the casing 18, outwardly through the bottom 26 of the casing 18 and upwardly through the annular space 20 to displace drilling fluid positioned in annulus 20 upwardly through the annular space and out of the wellbore 10 through a line 24. The cement injection may be continued until cement is recovered through the line 24 or until the cement has been positioned in annulus 20 to a desired level. Such operations are considered to be well known to those skilled in the art.

Dispersants used in the cement slurry composition of the present invention are selected from water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof. These materials are not new per se and may be produced by well-known processes. The production of dispersants of this type is described in U.S. Pat. No. 4,892,898, "Water Soluble Polymers Containing Allyloxybenzene Sulfonate Monomers", issued Jan. 9, 1990 to Leighton et al, which is hereby incorporated in its entirety by reference. Such dispersants are available from ALCO Chemical, a division of National Starch and Chemical Company, 909 Mueller Drive, P.O. Box 5401, Chattanooga, Tenn. 37406 under the trademarks AQUATREAT AR-540 (liquid), AQUATREAT AR-540D (powder), AQUATREAT MPS (liquid), EXP 2289 (liquid) and Nacryl 90 (liquid). The dispersants marketed as liquids under the trademarks AQUATREAT MPS, EXP 2289 and Nacryl 90 can be spray dried to form powders. The dispersants marketed under the trademarks AQUATREAT AR-540 and AQUATREAT AR-540D comprise interpolymers of acrylic acid, allyloxybenzene sulfonate, allyl sulfonate and a non-ionic monomer. These interpolymers are preferred dispersants.

These dispersants are readily available and have been found to be surprisingly effective as dispersants in mixtures of drilling fluids and cementitious materials to form cement slurries. As previously mentioned, cementitious materials are typically selected from materials such as mixtures of lime, silica and alumina, lime and magnesia, silica and alumina and iron oxide, calcium sulphate, Portland cement, pozzolanic materials, such as ground slag and fly ash and the like. The dispersant is desirably mixed with the cementitious material and the drilling fluid in quantities from about 0.5 to about 15 pounds per 42 gallon barrel of the resulting cement slurry. Preferably, the dispersant is used in quantities from about 1 to about 5 pounds per barrel of cement slurry. The cementitious material is typically present in an amount from about 100 to about 400 pounds per 42 gallon barrel of the cement slurry.

The cement slurry composition of the present invention produced using drilling fluids with cementitious materials to form the cement slurry composition with effective amounts of the dispersants have desirable rheological properties, including desirable plastic viscosities and yield points.

The rheological parameters shown in Table 1 were determined with a Chan model 35 viscometer using a #1 bob and sleeve and a #1 spring. The viscometer uses a rotor and a bob which is attached to a spring to measure the shear stress factor in a fluid. The bob and rotor are immersed in the fluid which is contained in a stationary test cup. The rotor, arranged in concentric alignment with the bob, causes the fluid to move at various shear rates, while the bob by means of the attached spring, measures the torque exerted on the bob.

As shown below in Table 1, the dispersants of the present invention are surprisingly effective in providing desirable yield points and plastic viscosities in mixtures of drilling fluid and cementitious materials.

Desirably, the drilling fluid/cement slurry compositions have a plastic viscosity from about 10 to about 400 centipoises, and preferably from about 20 to about 200 centipoises at 80° F. and yield points from about 0 to about 100 lbs. per hundred feet squared and preferably from about 5 to about 50 lbs per hundred feet squared at 80° F.

Example 1

In this example a lignite mud having a density of 11 lbs. per gallon and a pH of 10.5 was prepared by mixing 294 grams of water, 15 grams of bentonite, 12.5 grams of sea salt, 0.3 grams of biocide, 6 grams of lignite, 0.5 grams of low-viscosity carboxymethylcellulose, 45 grams of calcined calcium montmorillonite, 10 grams of bentonite and 79.5 grams of barite for a total of 462 grams which results in the production of 350 cc's (cubic centimeters) of lignite mud (drilling fluid). This volume of mud is considered to be equivalent to one laboratory barrel of lignite mud. This lignite mud was mixed with 300 grams of ground Blue Circle slag (300 pounds per 42 gallon barrel of lignite mud), the resulting mixture was mixed and the plastic viscosity and yield points determined with the dispersants shown below in Table 1. The yield points were determined by linear regression using 300 through 30 RPM stress values.

TABLE 1

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| None | Will not mix | Will not mix | Will not mix | Will not mix | Will not mix |
| SVT-MA | 3 | 90 | 41 | 77 | 10 |
| AQUATREAT* AR-540-D | 3 | 102 | 43 | 73 | 2 |
| Nacryl 90* | 3 | 90 | 36 | 73 | 7 |
| EXP 2289* | 3 | 104 | 43 | 75 | 3 |
| AQUATREAT* MPS | 3 | 102 | 39 | 66 | 6 |
| Cement Dispersant A | 3 | Will not mix | Will not mix | Will not mix | Will not mix |
| Cement Dispersant A | 6 | Will not mix | Will not mix | Will not mix | Will not mix |
| Drilling Fluid Dispersant B | 3 | Will not mix | Will not mix | Will not mix | Will not mix |
| Drilling Fluid Dispersant B | 10 | Will not mix | Will not mix | Will not mix | Will not mix |

*Trademarks of ALCO Chemical, a division of National Starch and Chemical Company, 909 Mueller Drive, P.O. Box 5401, Chattanooga, Tennessee 37406.

It will be noted in Table 1 that with no dispersant the ingredients will not mix. Similarly, with cement dispersant A (sulfonated acetone condensed with formaldehyde) which is a commercially available dispersant for use with cement slurries the ingredients will not mix. The ingredients also will not mix using chrome lignosulfonate which is a drilling fluid dispersant (Drilling Fluid Dispersant B). With the quantities of the other dispersants shown desirable mixing and desirable plastic viscosity and yield points are achieved both at 80° F. and 190° F. in all cases. The results achieved with the dispersants of the present invention are comparable to those achieved with SVT-MA. In some instances lesser amounts of the dispersants of the present invention could be used since the yield points at 190° F. with the dispersants of the present invention are lower than required. Accordingly, the dispersants of the present invention could be used in lesser quantities than SVT-MA to achieve the same desirable results. The tests shown in Table 1 clearly demonstrate that the dispersants of the present invention are effective to disperse mixtures of drilling fluid and cement. The test results in Table 1 are considered to demonstrate that the dispersants are effective to produce drilling fluid/cement slurry compositions having desirable rheological properties for use in cementing wellbores from drilling fluids and pozzolanic cementitious materials.

Example 2

The same test procedures as in Example 1 were used. The drilling fluid was mixed with 300 grams (300 pounds per 42 gallon barrel of lignite mud) of class H portland cement and the resulting mixture was mixed and the plastic viscosity and yield points determined with the dispersants shown in Table 2 below.

TABLE 2

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| None | Will not mix | Will not mix | Will not mix | Will not mix | Will not mix |
| SVT-MA | 3 | 67 | 24 | 28 | 6 |
| AQUATREAT* AR-540-D | 3 | 71 | 28 | 9 | -1 |
| Nacryl 90* | 3 | 73 | 26 | 10 | 1 |
| EXP 2289* | 3 | 73 | 27 | 8 | -1 |
| AQUATREAT* MPS | 3 | 64 | 26 | 10 | 1 |
| Cement Dispersant A | 3 | Will not mix | Will not mix | Will not mix | Will not mix |
| Cement Dispersant A | 6 | Will not mix | Will not mix | Will not mix | Will not mix |
| Drilling Fluid Dispersant B | 3 | Will not mix | Will not mix | Will not mix | Will not mix |
| Drilling Fluid Dispersant B | 10 | Will not mix | Will not mix | Will not mix | Will not mix |

*Trademarks of ALCO Chemical, a division of National Starch and Chemical Company, 909 Mueller Drive, P.O. Box 5401, Chattanooga, Tennessee 37406.

The ingredients will not mix where no dispersant is used. Commercial cement dispersant A (sulfonated acetone condensed with formaldehyde) and drilling fluid dispersant B (chrome lignosulfonate) are also ineffective as dispersants. The other dispersants shown provide yield points and plastic viscosities comparable to or better than SVT-MA. To an even greater extent than shown in Table 1, the lower values for the yield points indicate that lesser quantities of the dispersants of the present invention than SVT-MA could be used to achieve comparable results. This example demonstrates the effectiveness of the dispersants of the present invention in the production of cement slurry compositions from drilling fluid and Portland cement which is considered representative of cementitious materials generally.

In the use of such cement slurry compositions to cement wellbores, the cement slurry composition may be used alone to displace the drilling fluid and position the cement slurry composition in the annular space around the casing. Alternatively, a spacer fluid such as those disclosed in U.S. Pat. Nos. 5,030,366; 5,113,943 and 5,292,367 previously incorporated by reference can be used ahead of the cement slurry composition to serve as a buffer between the composition and the drilling fluid in either or both of the wellbore and in the annulus. Such spacer fluids separate the drilling fluid and the cement slurry composition and are designed to more effectively remove drilling muds and the like which may be caked on the face of the wellbore.

The cement slurry composition as discussed previously may be used by pumping it downwardly through a cased wellbore through the casing, out the bottom of the casing and upwardly through an annular wellbore space between the outer diameter of the casing and the inside of the wellbore. The cement composition may be used alone and in such instances will displace drilling fluids and other wellbore fluids from the annular space unless the fluids are incompatible with the cement slurry composition. In such cases of incompatibility a variety of problems may be encountered. As discussed above spacer fluids are frequently used between the cement slurry composition and the wellbore fluids.

The cement slurry composition may also be used to fill wellbore spaces to plug the wellbore space. Such a plug may be positioned anywhere in the wellbore by injecting the cement slurry composition through a pipe positioned to extend to near the bottom of the wellbore space to be plugged, out the bottom of the pipe and upwardly through the annular space defined by the outer diameter of the pipe and the inside of the wellbore. The injection is continued until a desired quantity of the cement slurry composition has been injected. The cement slurry composition may be subjected to pressure as known to those skilled in the art to fill spaces in fluid communication with the wellbore space. The pipe is typically removed before the cement slurry composition solidifies. Similarly portions of a cased wellbore may be plugged. The use and positioning of previously known cement slurry compositions for such purposes is well known to those skilled in the art.

The cement slurry composition may also be formed by adding cement and the dispersant to circulate drilling fluid circulated in the wellbore. In this instance the cement and the dispersant are added to the drilling fluid as it is circulated through the casing and annulus to form a cement slurry composition having the desired consistency and rheological properties. One advantage of this method is that the drilling fluid/cement slurry can be recirculated through the well one or more times to improve the contact between the cement slurry composition and the wellbore. Such may be desirable, notwithstanding the added expense, where it is necessary to recirculate the cement slurry composition to ensure adequate cement bonding or where it is known that cement bonding will be difficult because of certain formation or drilling fluid properties.

While the present invention has been described by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A cement slurry composition comprising:
   a) a cementitious material;
   b) a drilling fluid; and
   c) a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene sulfonated or phosphonated vinyl toluene, sulfonated or phosphonated isobutylene, acrylamidopropane sulfonate, acrylamidopropanephosphonate, vinyl alcohol, sulfonated or phosphonated propene and alkali, alkaline earth and ammonium salts thereof.

2. The composition of claim 1 wherein said cementitious material comprises at least one cementitious material selected from mixtures of lime, silica and alumina, lime and magnesia, silica, alumina and iron oxide, calcium sulphate, Portland cement, ground slag and fly ash.

3. The composition of claim 1 wherein the drilling fluid is a water base drilling fluid.

4. The composition of claim 3 wherein the drilling fluid comprises water, density modifying additives and viscosifiers.

5. The composition of claim 1 wherein the dispersant is present in an amount equal to from about 0.5 to about 15 pounds per 42 gallon barrel of the composition.

6. The composition of claim 1 wherein the composition has a plastic viscosity at 80° F. equal to from about 10 to about 400 centipoises.

7. The composition of claim 1 wherein the composition has a yield point at 80° F. equal to from about 5 to about 100 pounds per 100 feet squared.

8. The composition of claim 1 wherein the dispersant is present in an amount equal to from about 1 to about 5 pounds per 42 gallon barrel of the composition.

9. A method for cementing a wellbore space occupied by a drilling fluid to sealingly fill the space, the method comprising, displacing the drilling fluid with a cement slurry composition comprising:
   a. a cementitious material;
   b. a drilling fluid; and
   c) a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene sulfonated or phosphonated vinyl toluene, sulfonated or phosphonated isobutylene, acrylamidopropane sulfonate, acrylamidopropanephosphonate, vinyl alcohol, sulfonated or phosphonated propene and alkali, alkaline earth and ammonium salts thereof.

10. The method of claim 9 wherein said cementitious material comprises at least one cementitious material selected from mixtures of lime, silica and alumina, lime and magnesia, silica and alumina and iron oxide, calcium sulphate, Portland cement, ground slag, and fly ash.

11. The method of claim 9 wherein the drilling fluid is a water base drilling fluid.

12. The method of claim 11 wherein the drilling fluid comprises water, density modifying additives and viscosifiers.

13. The method of claim 9 wherein the dispersant is present in an amount equal to from about 0.5 to about 15 pounds per 42 gallon of the composition.

14. The method of claim 9 wherein the composition has a plastic viscosity at 80° F. equal to from about 10 to about 400 centipoises.

15. The method of claim 9 wherein the composition has a yield point at 80° F. of equal to from about 0 to about 100 pounds per 100 feet squared.

16. The method of claim 9 wherein the dispersant is present in an amount equal to from about 1 to about 10 pounds per 42 gallon barrel of the composition.

17. The method of claim 9 wherein the space is an annular space between the outside of a wellbore casing positioned in the wellbore and the inside of the wellbore and wherein the composition is circulated downwardly through the wellbore casing, into the annular space and upwardly through the annular space.

18. The method of claim 17 wherein a spacer fluid is circulated ahead of the composition through at least a portion of the annular space.

19. The method of claim 9 wherein the composition is produced by adding the cement and the dispersant to the drilling fluid and mixing the composition by circulating the composition through a wellbore casing positioned in the wellbore and an annular space between the outside of the wellbore casing and the inside of the wellbore.

20. The method of claim 19 wherein at least a portion of the composition is recirculated.

21. The method of claim 9 wherein the dispersant is an interpolymer of acrylic acid, allyloxybenzene sulfonate, allylsulfonate and a non-ionic monomer.

22. A method for cementing a wellbore space by filling the wellbore space with a cement slurry composition comprising:
   a) a cementitious material;
   b) a drilling fluid; and
   c) a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene sulfonated or phosphonated vinyl toluene, sulfonated or phosphonated isobutylene, acrylamidopropane sulfonate, acrylamidopropanephosphonate, vinyl alcohol, sulfonated or phosphonated propene and alkali, alkaline earth and ammonium salts thereof.

23. The method of claim 22 wherein said cementitious material comprises at least one cementitious material selected from mixtures of lime, silica and alumina, lime and magnesia, silica and alumina and iron oxide, calcium sulphate, Portland cement, ground slag, and fly ash.

24. The method of claim 23 wherein the drilling fluid is a water base drilling fluid.

25. The method of claim 24 wherein the drilling fluid comprises water, density modifying additives and viscosifiers.

26. The method of claim 25 wherein the dispersant is present in an amount equal to from about 0.5 to about 15 pounds per 42 gallon of the composition.

27. The method of claim 26 wherein the wellbore space is an uncased portion of a wellbore.

28. The method of claim 26 wherein the wellbore space is a cased portion of a cased wellbore.

29. The method of claim 26 wherein the slurry composition is subjected to pressure in the wellbore space to at least partially fill any openings in fluid communication with the wellbore space.

* * * * *